July 15, 1958  L. C. STUKENBORG  2,843,408
LOCK FOR TURNBUCKLES
Filed June 27, 1956
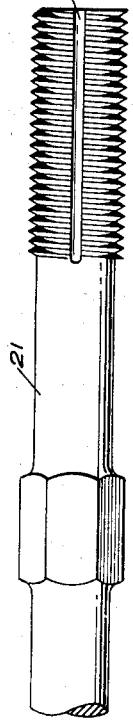
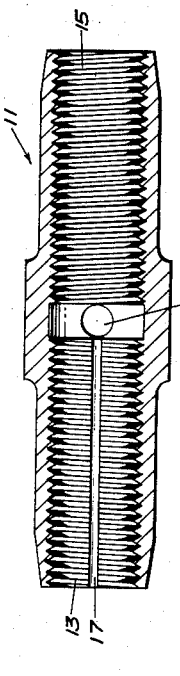
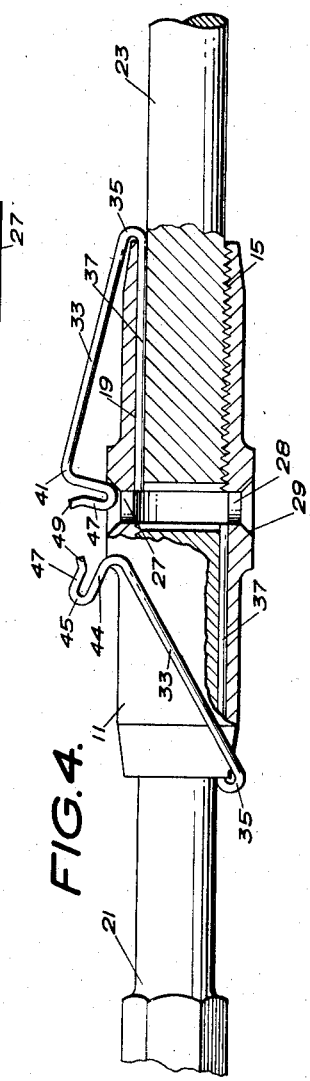
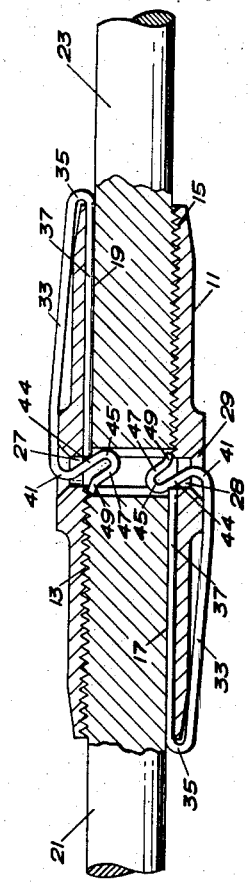
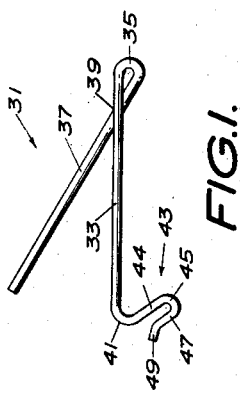
INVENTOR,
LOUIS C. STUKENBORG
BY
Weatherford & Weatherford
attys

United States Patent Office 2,843,408
Patented July 15, 1958

2,843,408

LOCK FOR TURNBUCKLES

Louis C. Stukenborg, Memphis, Tenn., assignor of fifty percent to Harold V. Utterback, Osyka, Miss.

Application June 27, 1956, Serial No. 594,247

7 Claims. (Cl. 287—60)

This invention relates to certain new and useful improvements in means for locking rotatably engaged members, such as turnbuckle barrels and rod ends or terminals joined by such turnbuckles against relative rotation.

This invention is an improvement on Stukenborg and Utterback Patent 2,580,482, and provides a superior latching of the lock member or clip into the turnbuckle than is found with the device of the patent just mentioned, while improving the facility of introducing the device into the turnbuckle assembly for locking purposes.

The present invention is particularly characterized by the improvements residing in the lock member or clip which comprises a resilient wire-like integral member adapted for use with a turnbuckle sleeve or barrel and a pair of threaded rod ends or terminals, such as of the type used in aircraft for connecting and maintaining the tension on cables or connecting rods in various portions of the aircraft structure, the lock member being adapted to interengage with elongated grooves provided in the barrel and rod ends to prevent relative rotation between those members and thus to insure the maintenance of the cable or rod connections.

The principal object of the present invention is to provide a new and novel lock member or clip for use with turnbuckle assemblies.

A further object of the invention is to provide such a lock member which comprises a resilient, integral wire-like element having an elongated locking portion adapted to lie within registered grooves formed in the members of a turnbuckle assembly, a stem connected to one end of the locking portion and being of substantially the same length as the locking portion, the stem when in rest position converging toward, crossing and extending beyond the crossing of the locking portion with an anchor portion connected to the opposite end of the stem, the anchor portion being disposed at an acute angle to the stem, the anchor portion also including an outwardly bent distal latch.

A further object of the invention is to provide in a turnbuckle assembly a lock clip including a locking portion, a stem connected with the locking portion and an anchor element connected with the stem and disposed at an acute angle relative to the stem.

A further object of the invention is to generally improve the design, construction and efficiency of locks for turnbuckle assemblies and the like.

The means by which the foregoing and other objects of the present invention are accomplished and the manner of their accomplishment will readily be understood from the following specification upon reference to the accompanying drawings, in which:

Fig. 1 is a side elevational view of the lock member or clip of the present invention in rest or non-use position.

Fig. 2 is a fragmentary elevational view of a typical rod end or terminal.

Fig. 3 is a cross sectional view of a turnbuckle sleeve or barrel.

Fig. 4 is a fragmentary view partly in section and partly in elevation, illustrating different stages in the introduction of the lock clip to the assembly; and Fig. 5 is a fragmentary longitudinal sectional view illustrating a turnbuckle assembly with lock clips in position.

Referring now to the drawings in which the various parts are indicated by numerals, the present invention is illustrated in connection with a turnbuckle assembly of the kind adapted for use in the interconnection of cables used in aircraft. The assembly includes a sleeve or barrel 11 which is internally threaded at its opposite ends with right and left hand threads 13, 15. Each of the internal threaded portions 13, 15 is longitudinally grooved across the threads as at 17, 19. Preferably groove 17 is on the diametrically opposite portion of barrel 11 from groove 19, although it will be understood that additional grooves 17, 19 may be provided in some circumstances if desired.

Threadedly engaged with the threaded portions 13, 15 of barrel 11 are the threaded ends of cable rods or terminals 21, 23, terminal end 21 being provided with external left hand threads and terminal end 23 with external right hand threads for respectively engaging the threaded portions of the barrel. Each of the external threaded portions of the terminals or rod ends is longitudinally grooved as at 25, the grooves 25 extending throughout the threaded portions and across the threads thereof. It will be understood that a cable or rod may be swaged into rod ends 21, 23, respectively, or a cable may be connected to an eye carried by such rod ends, such being well-known to those skilled in the art and not requiring detailed description. It will be observed that when the rod ends 21, 23 are engaged with barrel 11 they may be relatively rotated so as to bring the respective grooves 17, 19 of the barrel and 25 of the rod ends into register providing a conjoint channel for the reception of a wire-like portion of the locking member.

Barrel 11 is centrally apertured at diametrically opposed points as at 27, 28, and each of the apertures 27, 28 is preferably countersunk as indicated at 29.

In order to lock the assembly, consisting of the barrel 11 and rods 21, 23, against relative rotation after adjustment and positioning of the same has been determined, the present invention employs a lock member or clip 31, which is an integral member formed of a resilient spring material, preferably of wire-like nature. Lock member 31 comprises a stem 33 which is of a length to extend from the end of barrel 11 to one of the barrel apertures 27 or 28.

At one end of stem 33 the resilient wire of lock member 31 is arcuately bent through substantially two hundred ten degrees to provide a barrel-embracing end portion 35 and projecting from the end portion 35 is an elongated locking portion 37. Locking portion 37 is a substantially straight member which is of a length slightly less than the length of barrel grooves 17, 19, and the locking portion projects from end portion 35 to cross stem 33 as at 39 projecting beyond the stem and being urged into the position, as best seen in Figs. 1 and 4, by the resiliency of the spring-wire material. Locking portion 37 is of a length which is only minutely shorter than the length of stem 33. At the opposite end of stem 33, the resilient wire is arcuately bent, as at 41, through approximately one hundred twenty-five degrees and an anchor portion 43 projects from the arcuate bend 41, projecting away from stem portion 33 in a direction opposite to the projection of the free end of lock portion 37 beyond the stem.

Thus it will be seen that the anchor portion 43 is disposed at an acute angle relative to stem 33, that is the anchor portion is bent toward the end portion 35 so that it is disposed relative to the stem at a position substantially less than ninety degrees.

Preferably anchor portion 43 is substantially U-shaped with one leg 44 of the U providing the connection of the anchor portion to stem 33. The bight 45 of the U is preferably arcuately rounded, with the outside diameter of bight 45 being slightly less than the inside diameter of barrel apertures 27, 28, to provide for ready entrance of anchor 43 into a selected barrel aperture. The opposite or free leg 47 of the U is substantially straight for a portion of its length lying approximately parallel to leg 44, being spaced therefrom, with the distal end 49 of leg 47 being angularly outwardly flared away from leg 44 to provide a latch portion.

In the use of the device, rod ends 21, 23, which conventionally have connected thereto to a cable or rod, not shown, are introduced to barrel 11 and threadedly engaged therewith. Rotation of the barrel effects tensioning of the cables or rods connected with the rod ends, the threaded engagement being advanced in well-known manner until the desired tension is achieved, and the barrel grooves 17, 19 are respectively moved into register with rod grooves 25. With the turnbuckle thus assembled, as shown in Fig. 4, the lock clip 31 may then be introduced to the assembly. As seen in the left hand side of Fig. 4, locking portion 37 is inserted in the registered rod and barrel grooves, at which time it will be observed that the stem 33 and anchor 43 under the resiliency of the wire extend along the outside of the barrel and substantially project the anchor above the opposite side of the barrel. After thus inserting the lock portion in the registered grooves the stem 33 may be manually shifted against the resiliency of the spring material to a position such as is shown in the right hand side of Fig. 4. It will be observed that the shifting of the stem portion and the anchor carried thereby is substantially an arcuate movement swinging the stem and anchor portion about the end portion 35 and outwardly beyond the outer surface of barrel 11, a distance sufficient to move bight 45 beyond the surface of the barrel, where the anchor may be guided toward the barrel aperture.

It will be observed, when the stem and anchor have thus been swung beyond parallelism with the barrel and the locking portion, that the anchor portion in virtue of the angularity of intersection thereof with the stem is disposed substantially perpendicularly to the barrel aperture, providing for easy introduction of the bight 45 into the opening of the respective barrel apertures. The anchor portion will then move toward the barrel under the urging of the resiliency of the wire material and may be simply guided into position with but slight additional force being necessary to insure the entrance of the anchor portion into the barrel aperture. The countersink 29 assists in guiding the anchor toward the aperture and the outwardly flared latch portion 49 may be simply snapped past the edge of the aperture.

When the anchor portion has entered the barrel aperture it will seat into a position as shown in Fig. 5. It will be observed that under the resiliency of the material the stem 33 is urged to lie closely along the exterior of barrel 11, minimizing any possibility of undesired projection beyond the surface of the barrel, and it will further be observed that in virtue of the angularity of the anchor portion relative to the stem, the anchor is angularly disposed relative to the longitudinal axis of the barrel and tends to embrace the barrel material at the respective barrel apertures. The outwardly flared latch portion which has been snapped into position in entering through the aperture extends across the aperture, being of a substantially wider dimension than the diameter of the aperture and this flare is accentuated due to the angular intersection of the anchor portion with the stem.

Thus it will be seen that the lock portion when engaged with the registered grooves is effective to prevent relative rotation between the rod ends and the barrel, and the anchor portion is effective to lock the lock clip into position against the possibility of accidental engagement.

I claim:

1. A lock clip adapted for use with a turnbuckle assembly which includes longitudinally grooved rods and a barrel having grooves complementary to the grooves in said rods, said barrel being centrally transversely apertured to form diametrically opposed apertures, said clip comprising an integral resilient wire-like member including a stem having a length to span from one end of said barrel to one of said apertures, an elongated locking portion adapted for insertion in complementarily registered rod and barrel grooves, an arcuate end portion connecting one end of said stem to said locking portion with said locking portion normally resiliently urged into crossing alongside said stem adjacent said end portion and projecting therebeyond, said locking portion having a length substantially equal to but slightly less than the length of said stem, an anchor portion connected to the other end of said stem, said anchor portion being substantially U-shaped with one leg of the U intersecting said stem portion other end at an acute angle, the other leg of said U being substantially parallel to the first said leg and including a distal end flaring away from the first said leg remote from said stem, said legs being interconnected by an arcuate bight having a diameter less than the diameter of one of said barrel apertures, the material of said clip yielding to permit movement of said stem away from crossing said locking portion when said locking portion is engaged in registered grooves, said movement shifting said anchor to a position in which it is substantially perpendicular relative to said locking portion for entry into a barrel aperture.

2. A lock clip adapted for use with a turnbuckle assembly which includes longitudinally grooved rods and a barrel having grooves complementary to the grooves in said rods, said barrel being centrally transversely apertured to form diametrically opposed apertures, said clip comprising an integral resilient wire-like member including a stem having a length to span from one end of said barrel to one of said apertures, an elongated locking portion adapted for insertion in complementarily registered rod and barrel grooves, an arcuate end portion connecting one end of said stem to said locking portion with said locking portion normally resiliently urged into crossing alongside said stem adjacent said end portion and projecting therebeyond, said locking portion having a length substantially equal to but slightly less than the length of said stem, an anchor portion connected to the other end of said stem, said anchor portion being substantially U-shaped with one leg of the U intersecting said stem portion other end at an acute angle, the other leg of said U being substantially parallel to the first said leg, said legs being interconnected by an arcuate bight having a diameter less than the diameter of one of said barrel apertures, the material of said clip yielding to permit movement of said stem away from crossing said locking portion when said locking portion is engaged in registered grooves, said movement shifting said anchor portion to a position in which it is substantially perpendicular relative to said locking portion for entry into a barrel aperture.

3. A lock clip adapted for use with a turnbuckle assembly which includes longitudinally grooved rods and a barrel having grooves complementary to the grooves in said rods, said barrel being centrally transversely apertured to form diametrically opposed apertures, said clip comprising an integral resilient wire-like member including a stem having a length to span from one end of said barrel to one of said apertures, an elongated locking portion adapted for insertion in complementarily registered rod and barrel grooves, an end portion connecting one end of said stem to said locking portion with said locking portion normally resiliently urged into crossing alongside said stem adjacent said end portion and projecting therebeyond, said locking portion having a length substantially equal to but slightly less than the length of said stem, an anchor portion connected to the other end of said stem, said anchor portion intersecting said stem other end at an acute angle, the material of said clip yielding to permit movement of said stem away from crossing said locking portion when said locking portion is engaged in registered grooves, said movement shifting said anchor portion to a position in which it is substantially perpendicular relative to said locking portion for entry into a barrel aperture.

4. A lock clip adapted for use with a turnbuckle assembly which includes longitudinally grooved rods and a barrel having grooves complementary to the grooves in said rods, said barrel being centrally transversely apertured to form diametrically opposed apertures, said clip comprising an integral resilient member including a stem having a length to span from one end of said barrel to one of said apertures, a locking portion adapted for insertion in complementarily registered rod and barrel grooves, an end portion connecting one end of said stem with said locking portion, an anchor portion connected to the other end of said stem, said anchor portion intersecting said stem portion other end at an acute angle, the material of said clip yielding to permit movement of said stem away from said locking portion when said locking portion is engaged in registered grooves, said movement shifting said anchor portion to a position in which it is substantially perpendicular relative to said locking portion for entry into a barrel aperture.

5. In a turnbuckle assembly which includes a hollow, internally threaded barrel, threaded rod ends threadedly engaged with said barrel, said rod ends being respectively longitudinally grooved and said barrel having complementary grooves registered with said rod end grooves, said barrel being transversely apertured substantially at its longitudinal center, resilient wire-like lock clip means for locking said assembly against relative rotation comprising an elongated locking portion lying in and extending inwardly throughout the majority of the length of complementarily registered barrel and rod end grooves, a stem integrally connected at its outer end with the outer end of said locking portion lying along the exterior surface of said barrel and biased toward the surface of said barrel by the resiliency of said clip means, an anchor portion connected to the inner end of said stem, said anchor portion being substantially U-shaped with at least one leg of the U of said anchor portion intersecting said stem inner end at an acute angle, said anchor portion being inserted through a barrel aperture into the interior of said barrel and being disposed by said acute angularity to extend away from said last mentioned aperture toward the inner end of said locking portion and the outer end of said barrel, the other leg of said U having a flared distal end extending across said last mentioned aperture within said barrel and engaging said barrel remote from said locking portion inner end when said anchor portion is inserted to prevent removal of said clip from said assembly.

6. In a turnbuckle assembly which includes a hollow, internally threaded barrel, threaded rod ends threadedly engaged with said barrel, said rod ends being respectively longitudinally grooved and said barrel having complementary grooves registered with said rod end grooves, said barrel being transversely apertured substantially at its longitudinal center, resilient lock clip means for locking said assembly against relative rotation comprising an elongated locking portion lying in and extending inwardly throughout the majority of the length of complementarily registered barrel and rod end grooves, a stem integrally connected at its outer end with the outer end of said locking portion lying along the exterior surface of said barrel and biased toward the surface of said barrel by the resiliency of said clip means, an anchor portion connected to the inner end of said stem, at least a part of said anchor portion intersecting said stem inner end at an acute angle, said anchor portion being inserted through a barrel aperture into the interior of said barrel and being disposed by said acute angularity to extend away from said last mentioned aperture toward the inner end of said locking portion and the outer end of said barrel.

7. In a turnbuckle assembly which includes a hollow, internally threaded barrel, threaded rod ends threadedly engaged with said barrel, said rod ends being respectively longitudinally grooved and said barrel having complementary grooves registered with said rod end grooves, said barrel being transversely apertured substantially at its longitudinal center, resilient wire-like lock clip means for locking said assembly against relative rotation comprising an elongated locking portion lying in and extending inwardly throughout the majority of the length of complementarily registered barrel and rod end grooves, a stem integrally connected at its outer end with the outer end of said locking portion and biased toward the surface of said barrel by the resiliency of said clip means, an anchor portion connected to the inner end of said stem, said anchor portion being substantially U-shaped with at least one leg of the U of said anchor portion intersecting said stem inner end at an acute angle, said anchor portion being inserted through a barrel aperture into the interior of said barrel and being disposed by said acute angularity to extend away from said last mentioned aperture toward the inner end of said locking portion and the outer end of said barrel.

References Cited in the file of this patent

UNITED STATES PATENTS

| | | |
|---|---|---|
| 1,281,469 | Wood | Oct. 15, 1918 |
| 1,321,113 | Longren | Nov. 11, 1919 |
| 2,580,482 | Stukenborg et al. | Jan. 1, 1952 |
| 2,694,586 | Smith | Nov. 16, 1954 |